E. P. HOLDEN.
CAN FILLING MACHINE.
APPLICATION FILED DEC. 18, 1911.
1,036,846.
Patented Aug. 27, 1912.
11 SHEETS—SHEET 9.
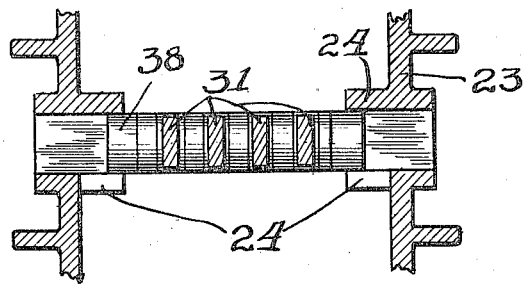
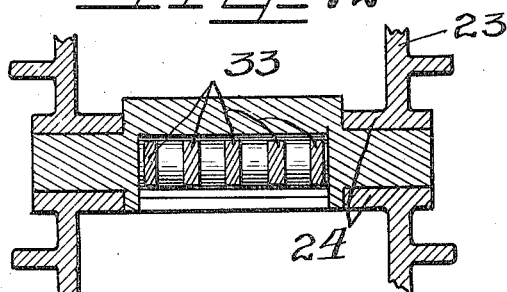
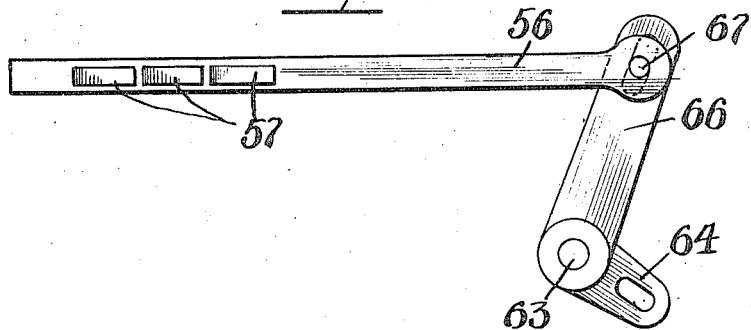

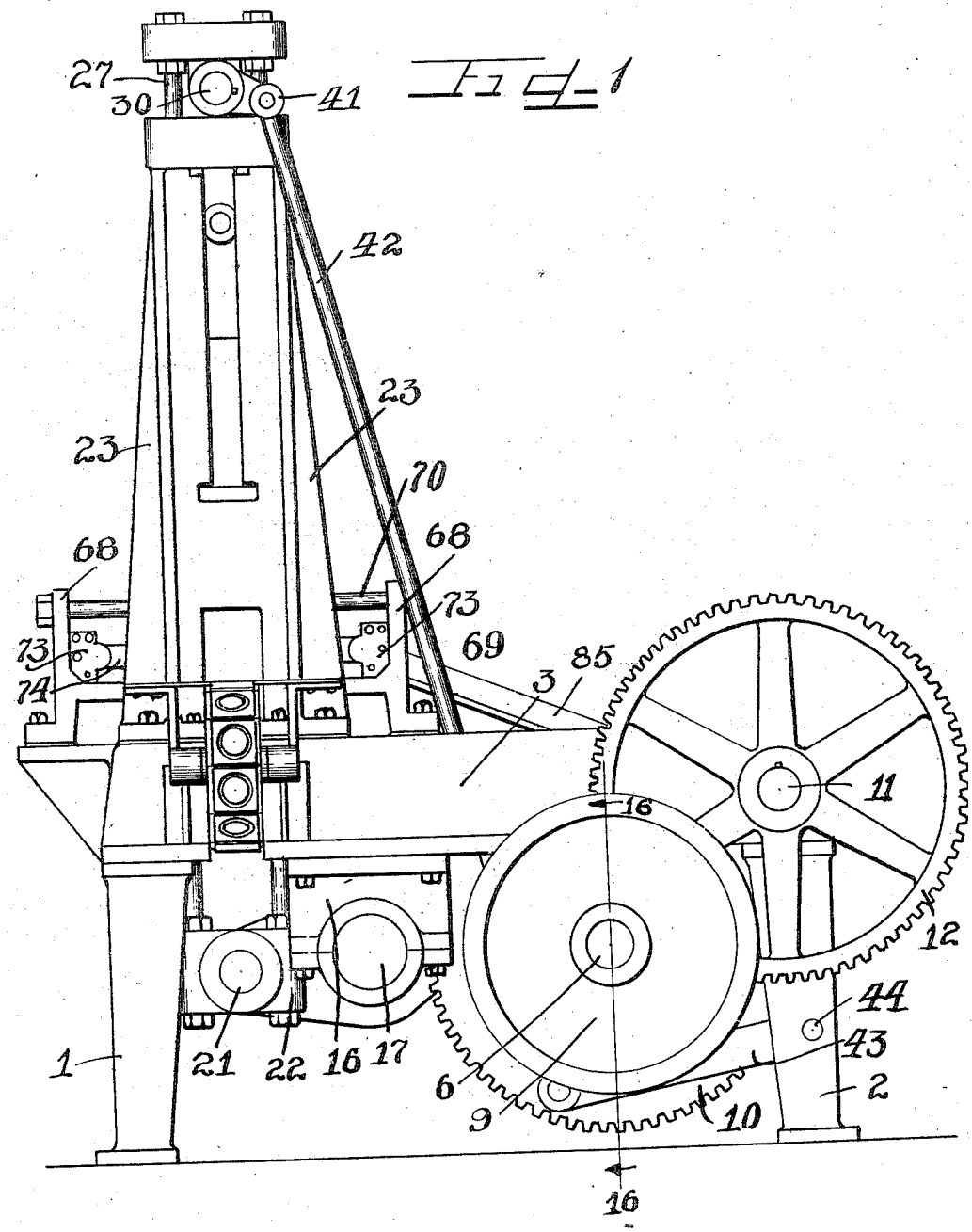

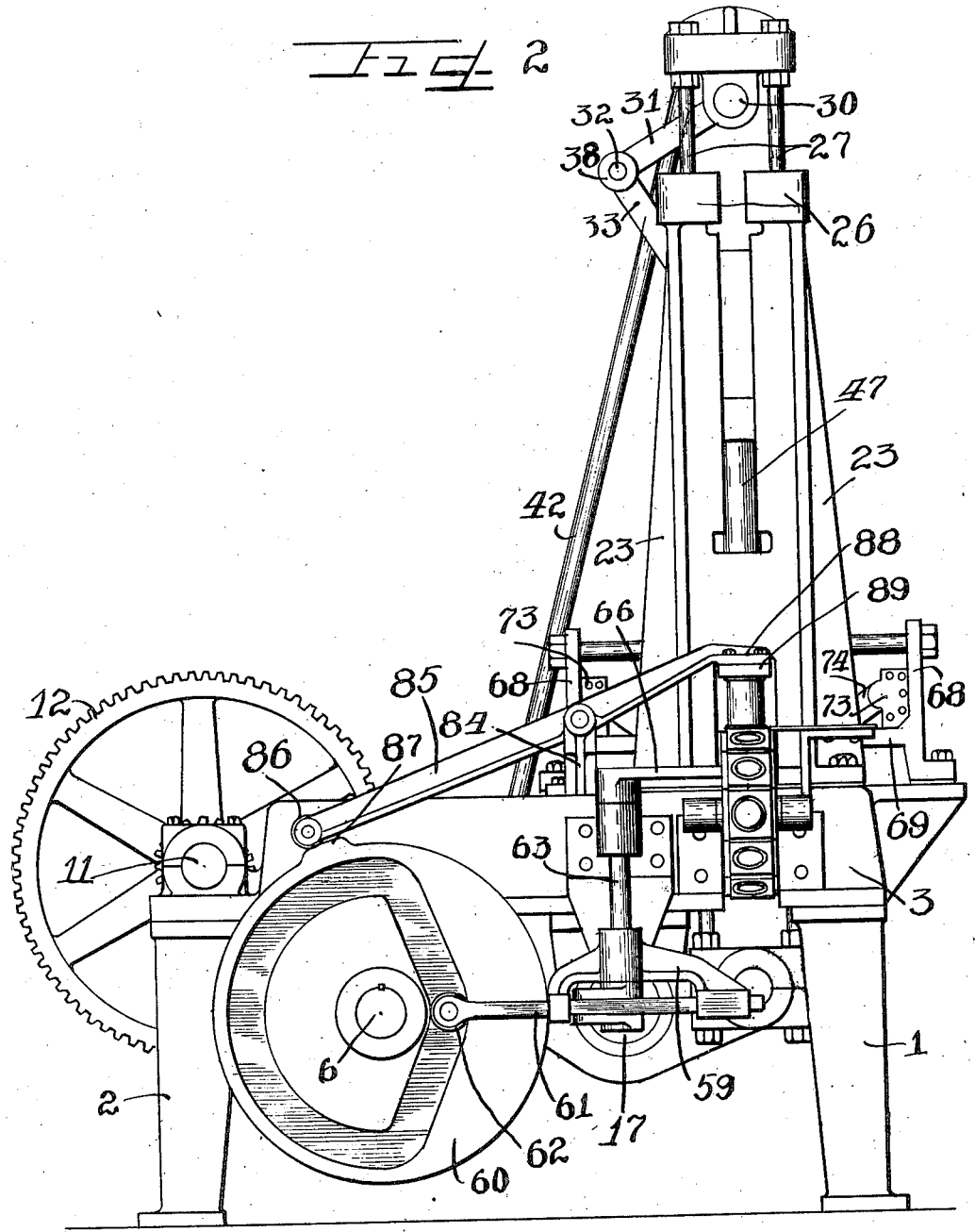

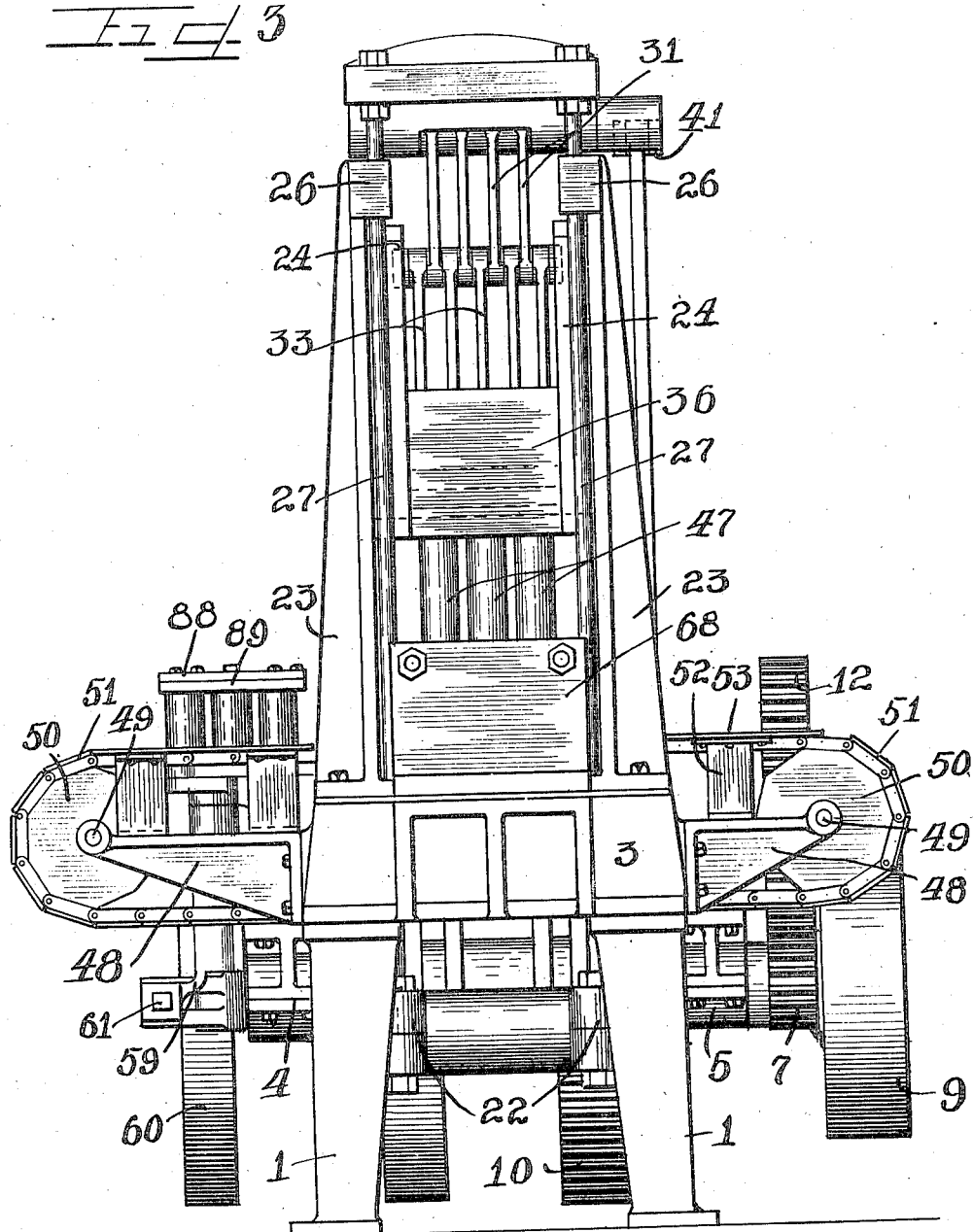

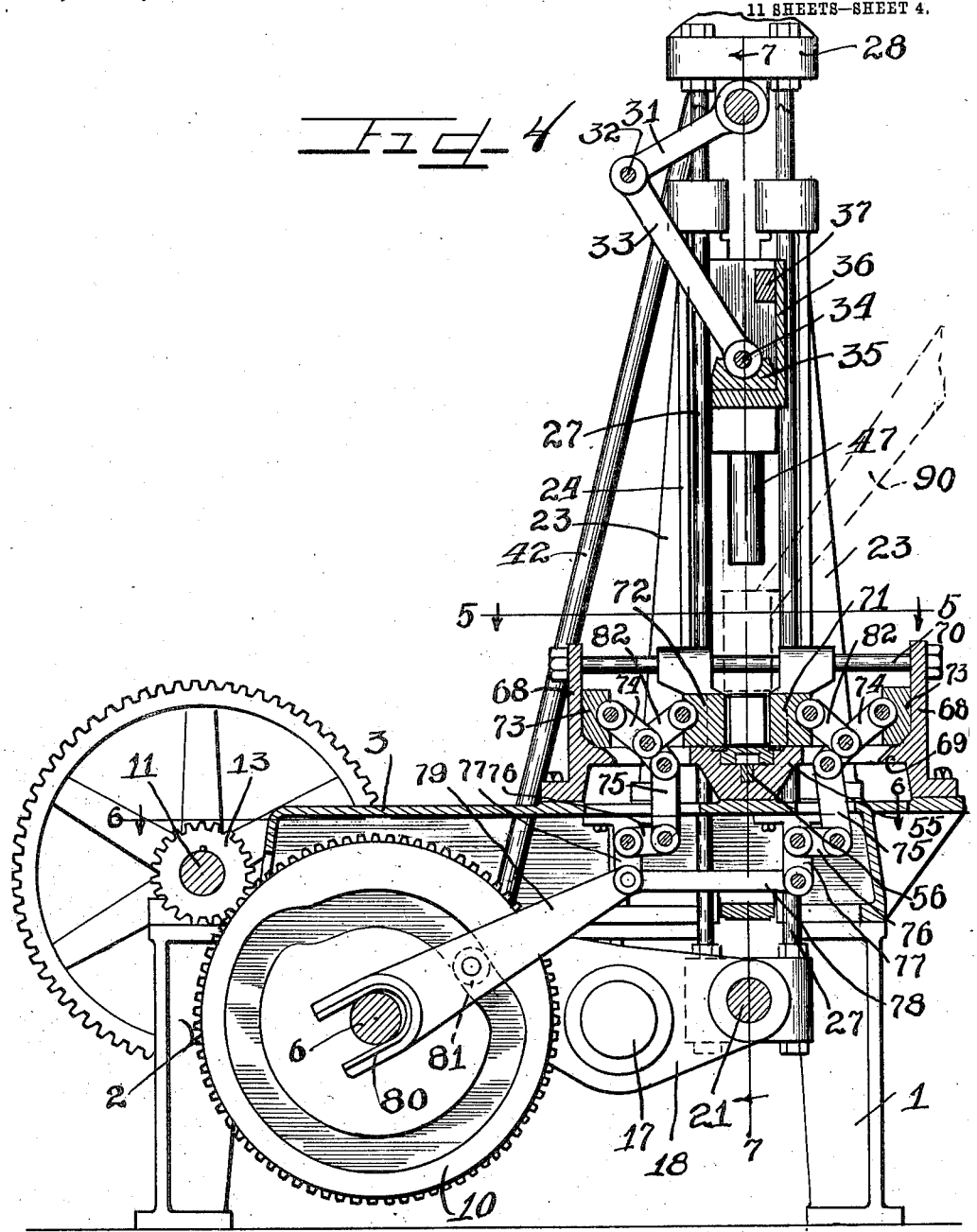

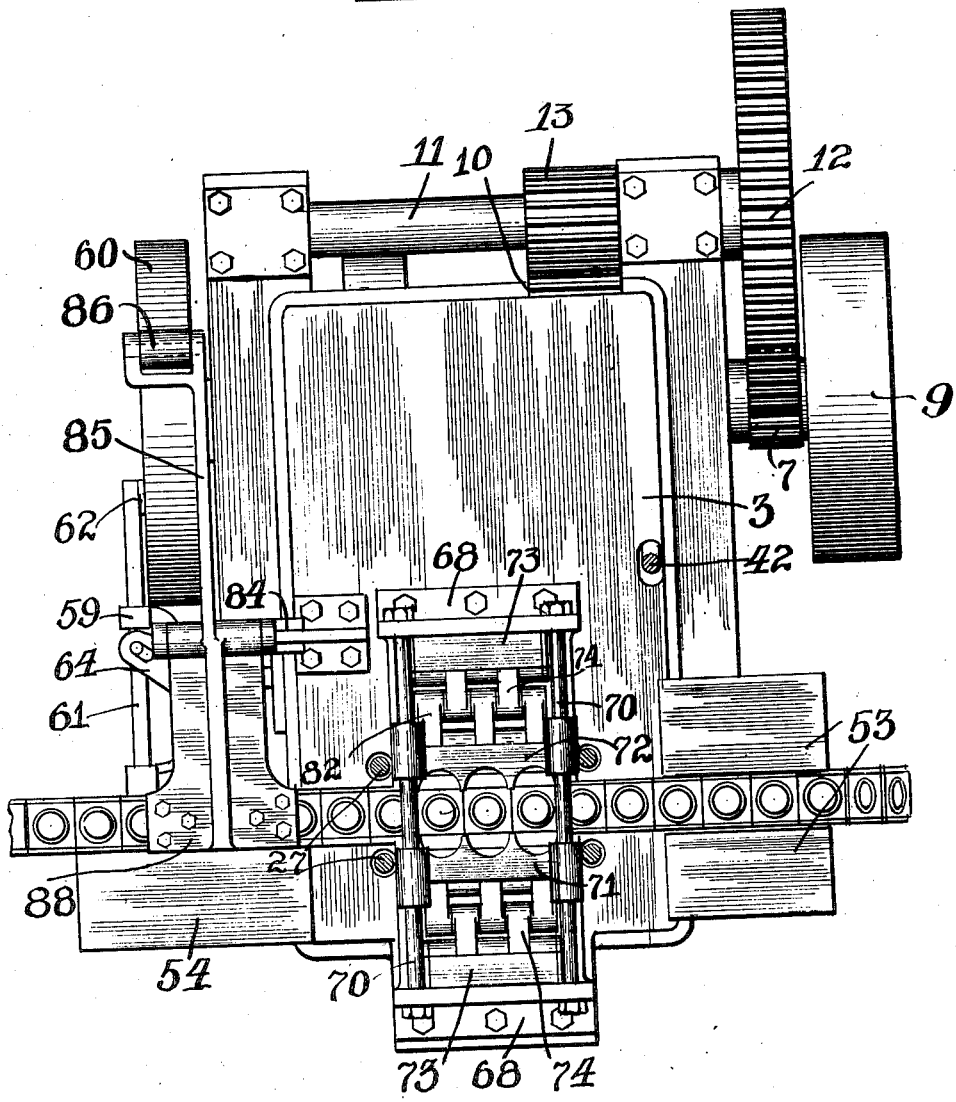

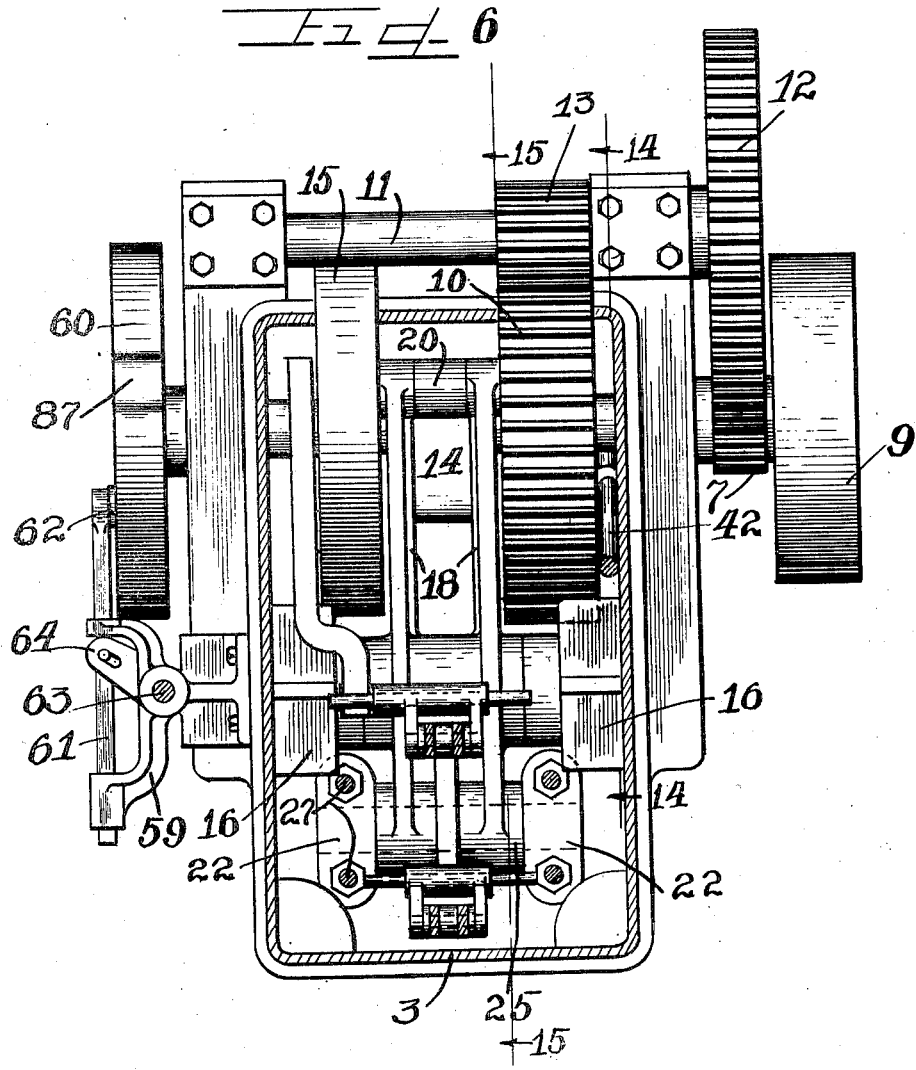

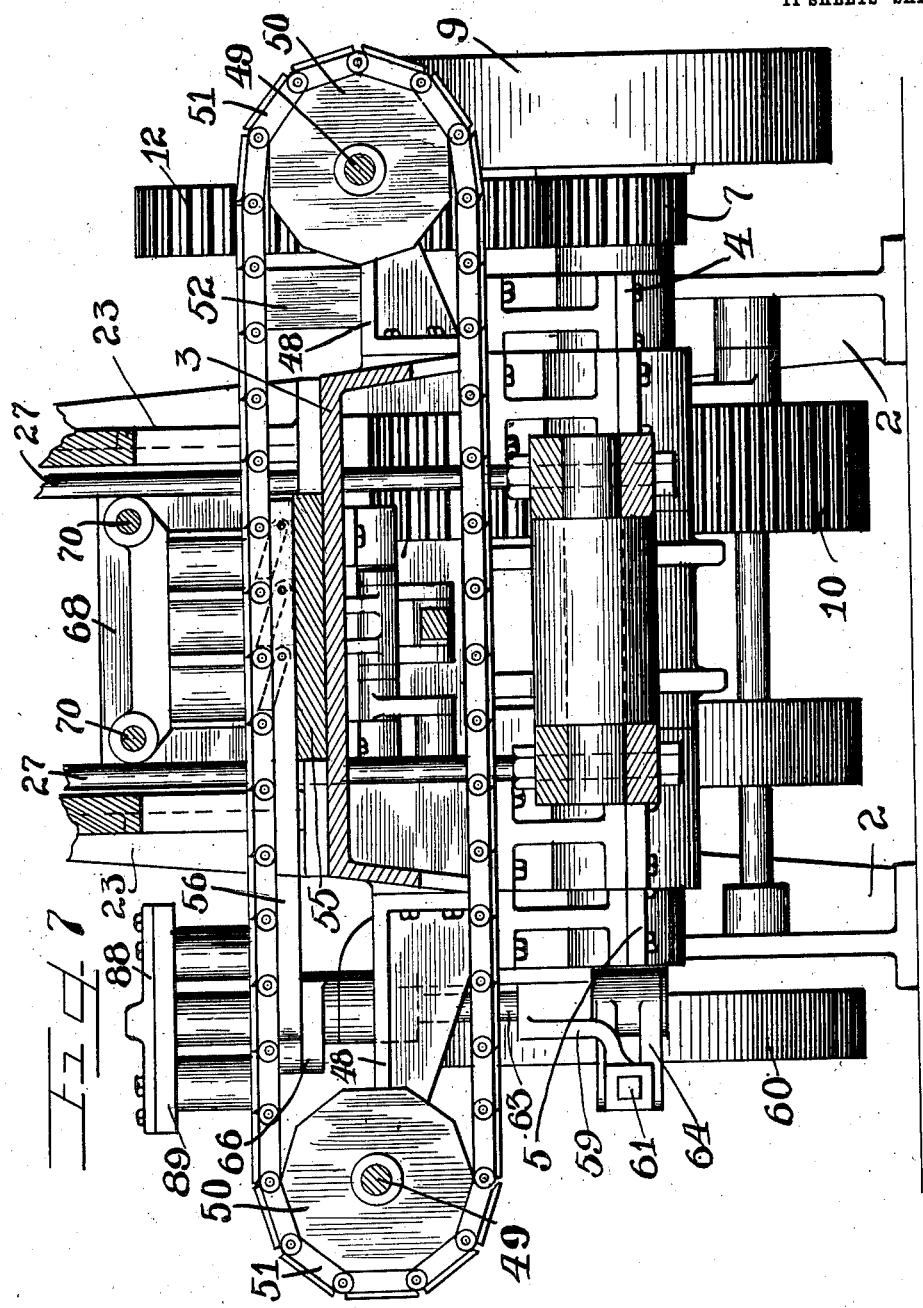

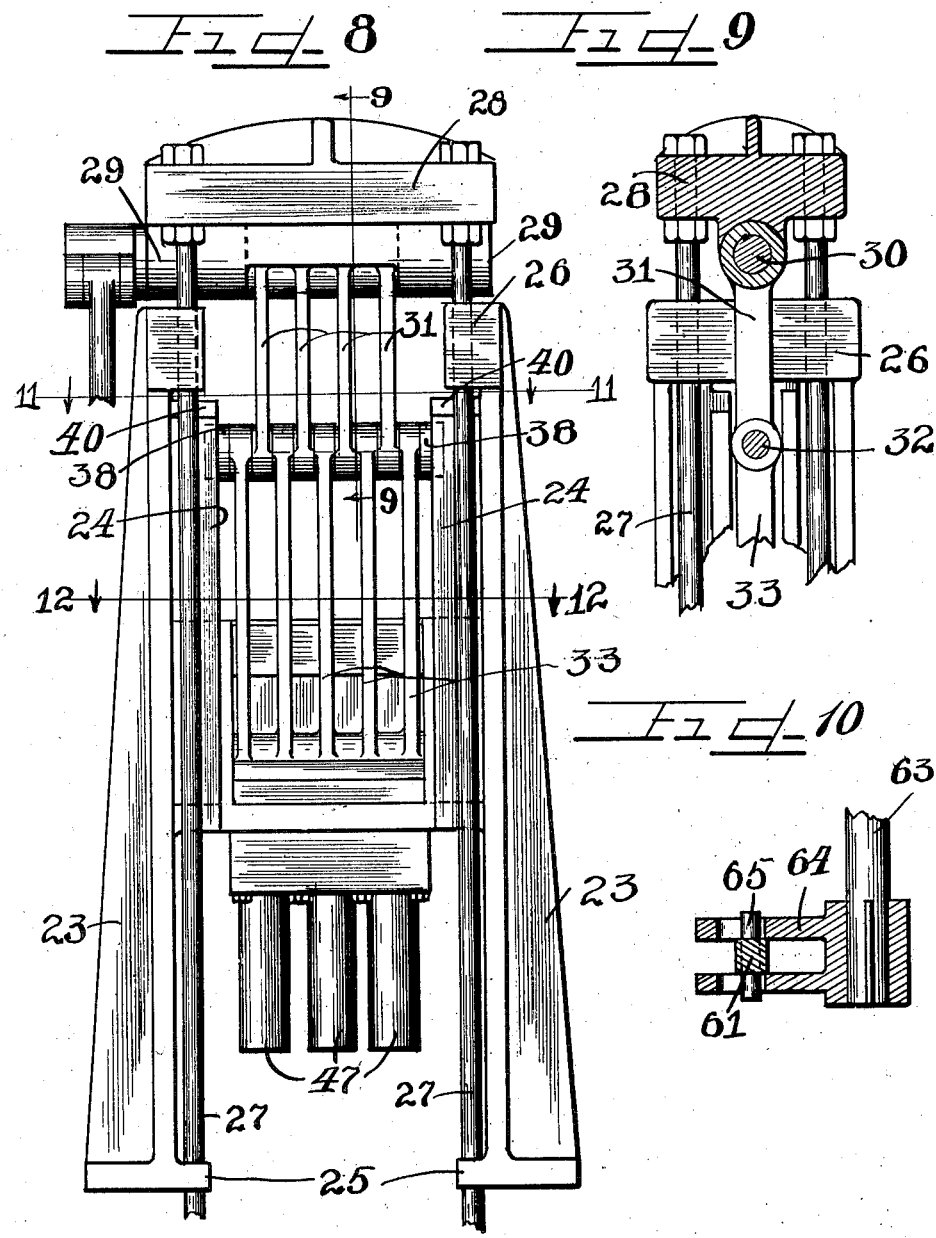

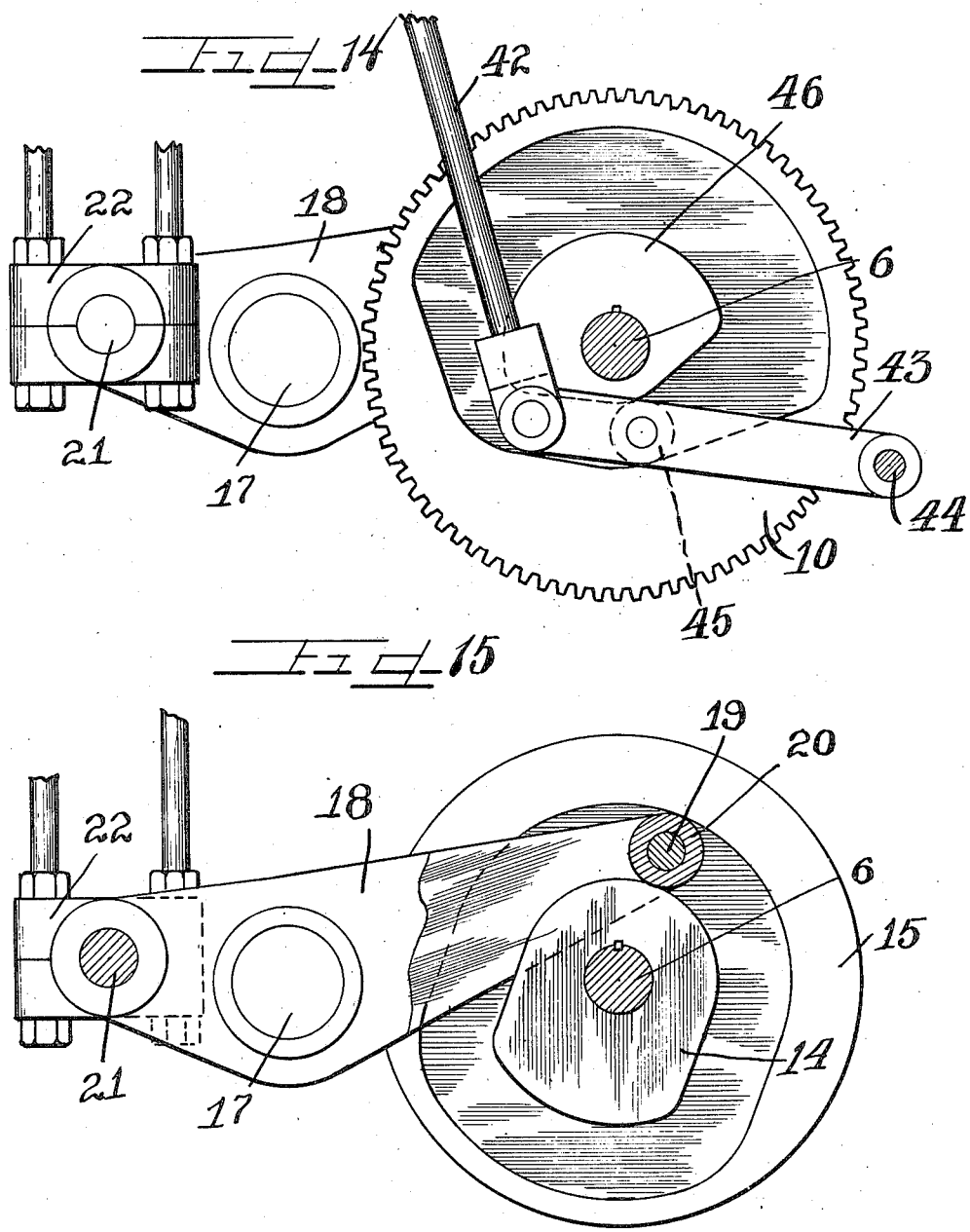

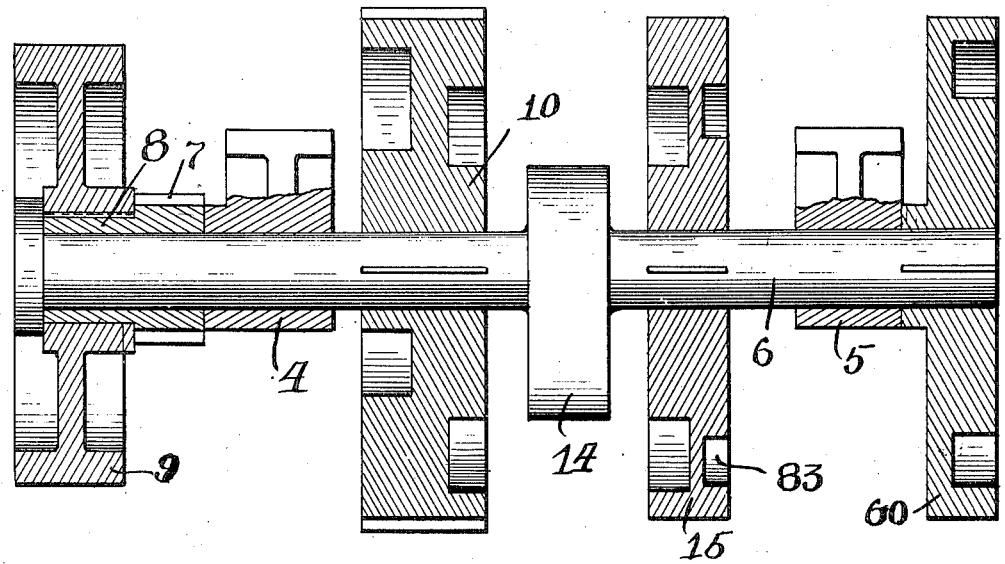

UNITED STATES PATENT OFFICE.

EDWARD P. HOLDEN, OF CHICAGO, ILLINOIS, ASSIGNOR, BY MESNE ASSIGNMENTS, TO CORNO MILLS CO.

CAN-FILLING MACHINE.

1,036,846.  Specification of Letters Patent.  Patented Aug. 27, 1912.

Application filed December 18, 1911. Serial No. 666,334.

*To all whom it may concern:*

Be it known that I, EDWARD P. HOLDEN, a citizen of the United States, and a resident of the city of Chicago, in the county of Cook and State of Illinois, have invented certain new and useful Improvements in Can-Filling Machines; and I do hereby declare that the following is a full, clear, and exact description of the same, reference being had to the accompanying drawings, and to the numbers of reference marked thereon, which form a part of this specification.

Certain food products, for example, oatmeal and other cereal products, are preserved with difficulty in certain climates as heretofore ordinarily packed. This is particularly true with export oatmeal and it has been found through experience that in some climates such products packed in paper cartons, quickly deteriorate through the absorption of moisture and from other causes, while if put and compressed into metallic cans, tightly sealed, deterioration is prevented and the product may be kept for long periods of time without injury.

The object of this invention is to afford a machine for packing a cereal, for example, oatmeal flakes or rolled oats, into metallic cans to enable the required amount, for example, one pound, to be placed in a can of the smallest possible size to economize in storage and shipping, and to so compress a cereal and seal the can as to prevent deterioration.

It is also an object of the invention to afford a press adapted for use in conjunction with any suitable charging or loading machine, and acting to exert high pressure upon the contents of the can, reducing the same practically to the condition of a solid mass within the can.

It is also an object of the invention to afford a construction in which the can is rigidly engaged and held from disruption, distortion or deformation during the filling and pressing operation, and in which the holding and the pressing means coact to afford a brief dwell at the point of maximum compression to set the material in place.

It is also an object of the invention to afford a feed mechanism for successively passing the cans to and removing the same from loading position, and to afford an automatic and positive drive therefor acting to exactly position the cans for the respective compressing elements in exact register therewith.

The invention in its preferred form is hereinafter more fully illustrated and described.

In the drawings: Figure 1 is a view in elevation of the drive or belt side of the machine. Fig. 2 is a view in elevation of the opposite side of the machine. Fig. 3 is a front elevation thereof. Fig. 4 is a central longitudinal section. Fig. 5 is a section on line 5—5 of Fig. 4. Fig. 6 is a section on line 6—6 of Fig. 4, with parts omitted. Fig. 7 is an enlarged fragmentary section on line 7—7 of Fig. 4. Fig. 8 is an enlarged rear elevation of the upper frame and parts connected therewith. Fig. 9 is a fragmentary section on line 9—9 of Fig. 8. Fig. 10 is an enlarged, sectional, fragmentary detail of a part of the feed mechanism for the conveyer. Fig. 11 is a section taken on line 11—11 of Fig. 8. Fig. 12 is a section on line 12—12 of Fig. 8. Fig. 13 is an enlarged detail view of a part of the conveyer feed mechanism. Fig. 14 is an enlarged section on line 14—14 of Fig. 6. Fig. 15 is an enlarged section broken away, on line 15—15 of Fig. 6. Fig. 16 is an enlarged view in elevation of the main shaft, with the gear wheels and all but one of the cams thereon in section. Fig. 17 is a fragmentary bottom plan view of the chain conveyer. Fig. 18 is a section taken on line 18—18 of Fig. 17, showing the driving connection between the feed mechanism and said conveyer. Fig. 19 is an end elevation of one of the links of the conveyer chain.

As shown in the drawings: Said machine embraces a suitable frame, an intermittently traveling carrier for the cans, means feeding the material into the cans, a battery of reciprocating plungers to compress the material in the cans, mechanism for automatically advancing and accurately positioning the cans beneath the plungers, and means for applying caps or covers to the filled cans. Said frame comprises front legs 1, and rear legs 2, on opposite sides of the machine, and, as shown, constructed of cast metal, though, of course, any suitable material will suffice, and supported and rigidly bolted thereon is a cast metal table 3, having integral side and end rails or flanges, which bear upon and are rigidly secured to said legs affording an exceedingly strong and rigid connection therewith. Journaled in suitable bearings 4 and 5, extending transversely the machine, and secured on the under side of the respective side rails or bars of the frame or table, is a main shaft 6. Journaled on said main shaft at the outer side of the bearing box 4, is a pinion 7, having an outwardly directed hub 8, thereon, on which is rigidly keyed a belt pulley 9. Rigidly keyed on the shaft at the inner side of said bearing box 4, is a large spur gear 10. Journaled transversely the machine above the legs 2, and in suitable bearing boxes at the ends of the table, is a shaft 11, and keyed thereon to mesh with the pinion 7, is a gear wheel 12. Also keyed on said shaft is a pinion 13, which meshes with the gear wheel 10, on the shaft 6. Said train of gears acts to reduce the speed of drive and greatly augment power as applied to the shaft 6, by the spur gear wheel 10.

Rigidly (and, as shown, integrally) secured on the main shaft 6, and midway between the bearing boxes 4 and 5, is a cam 14, having a somewhat abrupt throw therein, and release, and affording a holding face substantially concentric with the shaft to afford a dwell for the element actuated thereby, during a part of the revolution of the shaft 6. Rigidly keyed on the shaft 6, on the opposite side of the cam 14, from the gear wheel 10, is a cam wheel 15, and, as shown, said gear wheel 10, and said cam wheel 15, are each provided with a cam groove on the inner face thereof adjacent the cam 14, corresponding in shape therewith.

Journaled on suitable bearings 16, one on each side the frame at the under side thereof, on a shaft 17, is a lever, the power end of which is slotted to afford two parallel rearwardly directed arms 18, to extend one on each side of the cam 14, as shown in Fig. 6, and extending through suitable bearings at said extremities of said arms is a shaft 19, provided intermediate said arms with a roller 20, thereon to track on the periphery of the cam 14, and provided on each extremity with a roller of like size, which fit and travel respectively in the cam grooves in the gear 10, and in the cam wheel 15, thereby affording a large bearing upon the cam surface whereby said lever is actuated. The forward or weight end of said lever is provided with a transverse bore therethrough parallel the shaft 17, on which said lever is fulcrumed, and extending therethrough is a shaft 21, which is journaled at its ends at each side the lever in the bearing blocks 22. Rigidly bolted on the table, one on each side, and at the front end thereof, are upwardly extending standards or posts 23, which extend well above the table and are provided on the inner side thereof with parallel guides 24, one on each side of the same extending from the top thereof to near the bottom.

Rigidly secured in the bearing blocks 22, and extending upwardly through the table and through the foot flanges 25, and through the inwardly directed head 26, of each of said standards, are rods 27, two in number, at each of said standards. Rigidly connecting said rods at their upper ends is a saddle or head block 28, having bearing blocks 29, on the under side thereof arranged transversely the machine. Journaled in said bearing blocks 29, is a shaft 30, and keyed thereto are parallel toggle arms 31, through the lower ends of which extends a shaft or pintle 32, which also extends through the upper ends of corresponding toggle bars 33. The lower ends of said toggle bars 33, are connected or articulated by means of a shaft 34, with a head block 35, secured in a carriage 36 adapted to reciprocate up and down between the guides 24, on said standards, and, as shown, a stop 37, is provided in said carriage to limit the inward swing of the joint in said toggle bars to vertical alinement. As shown, the shaft 32, articulating the toggle bars 31, with the toggle bars 33, is provided at opposite ends with a roller 38, as shown in Fig. 8, which engages between the parallel guide members or ways 24, on each standard when the toggle bars are brought into alinement and which act to hold the toggle bars in alinement when maximum pressure is applied. As shown, the rear of said ways is provided with an upward projection 40, which acts with said stop 37, to insure the rollers on the end of the shaft entering between the ways when the toggle bars are thrown into alinement. Rigidly secured on the end of the shaft 30, is a crank arm 41, and journaled thereon at one of its ends is an actuating rod 42, the lower end of which extends through the table 3, and articulates with the forward end of a lever 43, which is pivotally engaged on one of the rear legs 2, by means of a stud 44, as shown in Figs. 1 and 14. Journaled on the inner side of said lever 43, is an anti-friction roller 45, shown in dotted lines in Fig. 14, which extends into, and travels in a cam recess in the outer side of the gear wheel 10. Said cam groove in said gear wheel, as shown, is of such cor formation as to afford a projection or throw 46, substantially concentric with the shaft 6, for approximately one hundred and eighty degrees, and acting to draw the rod 42 downwardly, thereby bringing the toggle bars into alinement and sliding the carriage downwardly. At the opposite side of said projection or throw 46, the opposite wall of the groove approaches the shaft to elevate said rod 42, and the toggle bars and carriage and at all other points said cam groove is sufficiently broad to permit downward movement of said rod 42, independently of the cam surface normally actuating the same. Secured on said carriage on the under side thereof, are a plurality of plungers 47, as shown three in number, and arranged in parallel relation and in alinement transversely the machine, each of said plungers being of a size to fit within the can to be packed.

The conveyer or carrier for the cans, is arranged transversely the front end of the machine and comprises an endless traveling link belt by means of which the cans are conveyed and accurately positioned beneath the compressing plungers. As shown, laterally directed brackets 48, are provided, one on each side of the machine, and rigidly bolted thereto and in alinement with the standards 23, for the compressing plungers 47. Journaled at the outer ends of said brackets on the shafts 49, are sprocket wheels 50, which may be of any suitable type, but which, as shown, each comprises a polygon having faces corresponding in length with the links 51, of the conveyer chain. Said links 51, of said carrier chain or conveyer are of a well known type, affording a flat continuous carrying surface on the upper run thereof between the sprocket wheels. Supported on said brackets 48, on standards 52, arranged on opposite sides of the standards 23, for the plunger, are tables 53 and 54, the one serving as a feed table and the other to receive the filled cans after the same have been capped or closed. As shown, a metallic beam or bed piece 55, is supported on the top of the table 3, beneath the upper run of the conveyer, and serves as a positive support therefor beneath the plungers, and, as shown, is milled to afford a seat for the chain, so that the chain lies with the upper or supporting surface thereof, substantially flush with the surface of said beam 55. As shown also, a longitudinal groove is provided in said beam beneath the upper run of the chain and slidably engaged therein is a reciprocating feed bar 56, as shown in Figs. 4, 7, and 18, which lies beneath the longitudinal middle of the chain and is provided in its face with recesses at intervals apart corresponding with the length of the links 51, of the chain, and secured in said recesses and at their rear ends, are spring pressed pawls 57, one beneath each of the plungers 47, as shown in Fig. 18, and in dotted lines in Fig. 7, and which engage in complemental recesses in the links of said conveyer to afford means for engaging the conveyer and correctly positioning the cans thereon beneath the plungers. Said feed bar may be actuated in any suitable manner. As shown, however, a bracket 59, is rigidly secured on the side of the machine near the cam wheel 60, rigidly secured on the shaft 6. Said bracket supports the slide bar 61, which is provided at its rear end with an anti-friction roller 62, which tracks in a cam groove in the cam wheel 60, as shown in Fig. 2, and which acts with each rotation of the shaft 6, to reciprocate said slide bar forwardly and to return the same to normal. The throw of the cam on said cam wheel 60, is equal to the distance the filled cans are required to move to clear the plungers and to position the next succeeding empty cans beneath the plungers for filling. Journaled in said bracket 59, is an upright shaft 63, and rigidly secured on the lower end thereof are slotted crank arms 64. The cam rod 61, extends between the crank arms 64 and is engaged thereto by means of a pin 65, which extends through slotted apertures in the arms of said crank, as shown in Fig. 10. At its upper end said shaft 63, is provided with a crank arm 66, as shown in Figs. 2 and 13, and in the extremity of which is a slotted aperture adapted to engage the pin 67, engaged in the outer end of the pawl rod or actuating bar 56, before described.

The links 51, of the carrier chain are each provided centrally in the upper face thereof, with a circular groove, as shown in Figs. 1, 2 and 5, to receive the flange of the can therein to permit the bottom of the can to rest fair upon the face of the link, said circular groove being of a size to fit comparatively closely to the end flange of the can, thus serving as a guide to exactly position each empty can upon the conveyer or carrier to register with the plunger therefor in filling and compressing.

Owing to the great pressure exerted on the contents of the can, it is also desirable to support the side walls of the can during the compressing operation. For this purpose, as shown, upwardly extending transverse brackets 68, are rigidly bolted to the table at the front and at the rear of the standards 23, and transversely the frame, as shown in Figs. 1, 4 and 5, and integral with the inner side of each is provided a ledge or shelf 69, the top of which is on the same level with the top of the conveyer or carrier chain, and the top of the supporting or bed beam 55. Connecting said brackets at their top and extending longitudinally the table, are rods 70, arranged closely adjacent the standards 23, before described. Slidably supported on said rods are clamping jaws 71 and 72, on the front and the rear side of the conveyer chain respectively, as shown in Figs. 4 and 5, and which are provided with semi-circular seats in the corresponding faces thereof to engage a can therein and therebetween. Supported upon the ledge 69, of the bracket 68, in any suitable manner, is a bar or beam 73, arranged at the same level with the clamping jaws 71 and 72, and pivotally engaged thereon is a link 74, the other extremity of which is connected by means of a link 75, with one arm 76, of a bell-crank, which is journaled in suitable bearings below the table top and the other arm 77, of which extends downwardly. The downwardly directed ends of said bell cranks are pivotally connected by means of a link 78, and pivotally engaged at the rear end of said link 78, and to said bell cranks thereby, is a reciprocating cam rod 79, which is provided with a yoke 80, at its rear end, which engages over the shaft 6, to support the rear end thereof. As shown, an anti-friction roller 81, is journaled on the inner side of the cam rod and tracks in a suitable cam groove 83, in the outer side of the cam wheel 15.
As shown, a link or toggle bar 82, is engaged on each of the clamping jaws 71 and 72, and pivotally engaged on the link 74, between the ends thereof, and the cam is so timed that as the chain moves forwardly positioning the empty cans beneath the plungers and comes to rest, the clamping jaws 71 and 72, are reciprocated inwardly to firmly engage the cans therebetween, supporting and holding the same against the thrust of the plungers, and releasing and retracting said jaws when the compressing operation is completed and just before the conveyer chain begins its next forward movement.
Conveniently, and, as shown, the brackets 68, and the bed beam 55, may be constructed integrally, it merely being necessary to provide apertures on each side the bed beam for the toggle levers before described, to engage therethrough.

Means are provided for closing or capping the cans after the same have been filled. For this purpose, as shown in Figs. 2, 3, 5, and 7, a bracket 84, is secured on the table at the discharge side of the machine, and pivotally engaged thereon is a lever, one end 85, of which extends rearwardly and over the cam wheel 60, and is provided with an anti-friction roller 86, on the extremity thereof to track on the periphery of said cam wheel. A projection 87, is provided on said periphery to engage the extremity of said lever to throw the same upwardly and consequently depress the opposite end 88, of said lever, which projects over the discharge table 54. Secured transversely the forward end of said lever, is a capping die 89, having seats therein to fit into the spring caps for the cans, and acting to jam the caps into the cans to close the same.

The operation is as follows: The machine having been started in operation, the cans are placed upon the conveyer chain, one upon each link with the flange of the can bottom engaging in the groove in the face of the link. The conveyer chain is moved forward a number of links at a time, corresponding with the number of compressing plungers, this being accomplished by the throw of the cam wheel actuating the adjusting or actuating bar. As the carrier moves forwardly and comes to rest with a plurality of cans (in the present instance shown as three) positioned between the standards 23, and directly beneath the plungers, the material to be packed into the cans is fed downwardly through a chute 90, connected with any suitable measuring and charging device capable of discharging the requisite amount of material into the can, but which may be any of the well known types of devices of this kind, and forms no part of this invention. The requisite amount of material having been discharged into the can, immediately following the carrier coming to rest, the rod 42, is drawn downwardly by the cam projection 46, on the gear wheel 10, bringing the toggle bars 31 and 33, into alinement, and bringing the rollers on the shaft or pintle of the toggle bars between the guides 24, therefor, at the inner sides the standards 23, and with the plungers entered in the cans and exerting considerable pressure on the material therein. Simultaneously with the downward movement of the plungers, the clamping jaws 71 and 72, are brought into clamping engagement with the cans by the forward movement of the cam bar 79, actuating the bell cranks before described, thus positively supporting the cans upon all sides. The further rotation of the shaft 6, now brings the cam 14, and the corresponding cam faces in the gear wheel 10, and cam wheel 15, into engagement with the rollers 20, carried on the shaft 19, at the power end 18, of the main compressing lever, throwing the opposite end of said lever downwardly and thereby drawing the plungers downwardly through the medium of the rods 27, as shown in Fig. 8. The cam 14, and also the corresponding cam faces in the side of the gear wheel 10, and cam wheel 15, is provided with a relatively long bearing surface concentric with the shaft 6, acting to hold the plungers at their maximum compressing position for a sufficient period to permit the material (for illustration, rolled oats) to adapt itself to the pressure, so that with the retraction of the plungers by the continued rotation of the cam wheels before described, and the upward thrust of the rod 42, there is but very slight tendency for the material to follow the plungers. In other words, the slight dwell of the plungers upon the compressed material, acts to destroy the resiliency of the flake to some extent and also affords time to permit the escape of air from between the flakes, thus obviating a difficulty heretofore always found in machines of this class. At the moment the plungers are retracted, the clamping jaws 71 and 72, are also retracted from the cans, and the further rotation of the shaft 6, actuates the eccentric rod 61, to shift the actuating rod 56, and thereby through the medium of the pawls 57, and the chain carrier, a sufficient distance to feed the next succeeding three cans into compressing position, and the cans just filled to discharge condition. The operation is then repeated. As the cans with the compressed material therein, appear at the discharge side of the machine, an attendant places a spring or friction cap on each before the same passes under the sealing or capping die 89, and the same having passed beneath the capping die, as shown in Fig. 7, the projection 87, on the periphery of the cam wheel 60, actuates said capping die downwardly, jamming the spring or friction cap firmly into the mouth of the can, and in effect hermetically seals the same.

While I have shown a plurality of cans treated simultaneously in filling, compressing and sealing, it is to be understood that the machine, to all intents and purposes, operates the same whether one or many cans be operated upon. The great pressure to which the material is subjected, reduces the same to practically the condition of a solid mass within the can, without, however, so destroying the grain or flake as to preclude it assuming its usual and proper form when removed from the can and moistened. The spring or friction cap, however, serves to exclude all moisture from the can, and in consequence the contents remain unimpaired under practically any and all climatic conditions.

It is, of course, to be understood that details of construction and operation may be varied through a wide range, without departing from the principles of this invention, for I have described but one (and that the preferred) form of my invention, and I therefore do not purpose limiting the patent to be granted on this application otherwise than necessitated by the prior art.

I claim as my invention:

1. A can filling and compressing machine embracing a traveling bed for the cans, means delivering material into the cans when supported thereon, reciprocating plungers for compressing said material, and a maximum compressing device acting to complete the compression and to maintain the compressing pressure for a timed interval.

2. A compressing machine of the class described embracing a traveling bed for the cans to be filled, means delivering the material thereinto, reciprocating plungers, means actuating the same to afford a preliminary compression, and means acting thereon to increase the pressure to maximum and to retain the pressure thereon for a timed period.

3. In a compressing machine of the class described a traveling bed for the cans, means filling or charging the cans, one or more plungers, means projecting the same into the cans to compress the material therein, a cam operated lever for increasing said pressure to maximum and retaining the pressure thereon for a timed interval, and means engaging and supporting the cans peripherally during the compressing operation.

4. A machine of the class described embracing reciprocating plungers, means actuating the same to afford preliminary compression, a power operated lever for increasing said pressure to maximum, and retaining said pressure for an interval sufficient to permit the material to set, and reciprocating means for advancing the cans to and from compressing position.

5. A machine of the class described embracing an intermittently traveling conveyer for the cans to be filled, means for actuating the same, guides on said conveyer for positioning the cans to be filled, clamping mechanism for engaging the cans peripherally during the filling, and a reciprocating plunger for compressing the material in the cans while held by said clamping means, and means coacting therewith to retain such pressure until the material has set.

6. A machine of the class described embracing reciprocating plungers, means for actuating the same to afford a preliminary compression, means thereafter actuating the same to afford maximum compression and to retain such pressure until the material has set, and means supporting the cans peripherally during such compression and holding.

7. A machine of the class described embracing mechanism for advancing the cans to compressing position, positive supports for the bottom and sides of the can, compressing means acting upon the material in the cans, means maintaining maximum pressure on said material until said material sets, and means mechanically advancing the cans to be filled, to and from compressing position.

8. A machine of the class described embracing in combination a carrier for the cans, affording a support for the bottom thereof, clamps to engage the cans peripherally, means for compressing the material in the cans and maintaining such pressure until the material sets, and reciprocating plungers, means actuating the same to afford a preliminary compression, means thereafter actuating the same to afford maximum compression acting to advance the cans to and from filling position.

9. In a machine of the class described a chain carrier comprising links of uniform size, a seat for a can bottom in the top of each, a recess in the under side of each link, a reciprocatable pawl bar extended beneath the upper run of said chain, pawls thereon for engaging said recesses in a plurality of said links to shift the same to compressing position, reciprocating plungers positioned above said carrier and registering with the cans on said links at the limit of movement of the pawl bar, means for filling the cans with material, means actuating said plungers to afford a preliminary compression, a lever for increasing the pressure to maximum, and means supporting the cans peripherally during the compressing operation.

10. In a machine of the class described a carrier for moving the cans to filling position, plungers for compressing the material therein, oppositely movable clamps for engaging and supporting the cans peripherally therebetween during the compressing operation, a maximum compressing device acting to complete the compression and to maintain the compressing pressure for a predetermined period of time, and coacting elements acting to simultaneously actuate and retract said plungers and clamps.

11. In a machine of the class described a carrier for moving the cans to filling position, plungers for compressing the material therein, a maximum compressing device acting to complete the compression and to maintain the compressing pressure for a predetermined interval, oppositely movable clamps for engaging and supporting the cans peripherally therebetween during the compression operation, coacting elements acting to simultaneously actuate and retract said plungers and clamps, and means advancing the carrier acting after the retraction of the plunger and clamps.

12. In a machine of the class described a chain carrier comprising links, a seat for a can bottom in the top of each, a recess in the under side of each link, a reciprocatable pawl bar extended beneath the upper run of said chain, pawls thereon for engaging said recesses in a plurality of said links to shift the same to compressing position and reciprocating plungers positioned above said carrier and registering with the cans in said links at the limit of movement of the pawl bar.

13. In a machine of the class described a chain carrier comprising links of uniform size, a seat for a can bottom in the top of each, a recess in the under side of each link, a reciprocatable pawl bar extended beneath the upper run of said chain, pawls thereon for engaging said recesses in a plurality of said links to shift the same to compressing position, reciprocating plungers positioned above said carrier and registering with the cans on said links at the limit of movement of the pawl bar, means for filling the cans with material and means actuating said plungers to afford a compression.

14. In a machine of the class described a chain carrier comprising links of uniform size, a seat for a can bottom in the top of each, a reciprocatable pawl bar extended beneath the upper run of said chain, pawls thereon for engaging a plurality of said links to shift the same to compressing position, reciprocating plungers positioned above said carrier and registering with the cans on said links at the limit of movement of the pawl bar, means for filling the cans with material, means actuating said plungers to afford a preliminary compression and a lever for increasing the pressure to maximum.

15. In a machine of the class described a chain carrier comprising links, a seat for a can bottom in the top of each, a reciprocatable pawl bar extended beneath the upper run of said chain, pawls thereon for engaging a plurality of said links to shift the same to compressing position, reciprocating plungers positioned above said carrier and registering with the cans on said links at the limit of movement of the pawl bar, means for filling the cans with material, means actuating said plungers to afford compression and means supporting the cans peripherally during the compressing operation.

16. In a machine of the class described a chain carrier comprising links, a seat for a can bottom in the top of each, a reciprocatable pawl bar extended beneath the upper run of said chain, pawls thereon for engaging a plurality of said links to shift the same to compressing position, and reciprocating plungers positioned above said carrier and registering with the cans on said links at the limit of movement of the pawl bar.

In testimony whereof I have hereunto subscribed my name in the presence of two subscribing witnesses.

EDWARD P. HOLDEN.

Witnesses:
CHARLES W. HILLS, Jr.,
GEORGE R. MOORE.